United States Patent [19]
Task

[11] Patent Number: 5,973,852
[45] Date of Patent: Oct. 26, 1999

[54] VARIABLE POWER FLUID LENS

[75] Inventor: Harry L. Task, Riverside, Ohio

[73] Assignee: The United States of America as represented by the Secretary of the Air Force, Washington, D.C.

[21] Appl. No.: 09/047,955

[22] Filed: Mar. 26, 1998

[51] Int. Cl.⁶ .............................. G02B 1/06; G02B 3/12

[52] U.S. Cl. ........................................ 359/666; 359/665

[58] Field of Search ...................................... 359/665, 666

[56] References Cited

U.S. PATENT DOCUMENTS

| | | | |
|---|---|---|---|
| 2,836,101 | 5/1958 | De Swart | 359/666 |
| 4,834,512 | 5/1989 | Austin | 359/666 |

FOREIGN PATENT DOCUMENTS

| | | | |
|---|---|---|---|
| 2634287 | 1/1990 | France | 359/666 |
| 60-6901 | 1/1985 | Japan | 359/666 |
| 63-96602 | 4/1988 | Japan | 359/666 |
| 132 | of 1893 | United Kingdom | 359/666 |

OTHER PUBLICATIONS

"Optical Physics," Max Garbuny, Academic Press, NY, pp. 1–6; 280–282. (Cited Spec. p. 2), 1965.

"Fundamentals of Optics," Jenkins and White, 3d Ed., McGraw–Hill, NY, Chap. 4. (Cited Spec. p. 5), 1957.

"Applied Photographic Optics, Second Edition," Ray, Sidney F., Focal Press, Oxford, England, p. 99, 1997.

*Primary Examiner*—Georgia Epps
*Assistant Examiner*—Evelyn A. Lester
*Attorney, Agent, or Firm*—Bobby D. Scearce; Thomas L. Kundert

[57] ABSTRACT

A fluid filled variable power optical lens is described that includes a substantially tubular shaped housing having in one embodiment an optically transparent elastic membrane disposed over one end thereof and a transparent plate over the second end thereof and defining a chamber for containing an optically transparent fluid and in another embodiment an optically transparent elastic membrane disposed over each end thereof and defining a chamber containing the fluid, and pump assembly for inserting or withdrawing fluid from the chamber whereby each membrane is correspondingly selectively bulged outwardly or inwardly in the shape of a convex or concave lens.

3 Claims, 4 Drawing Sheets

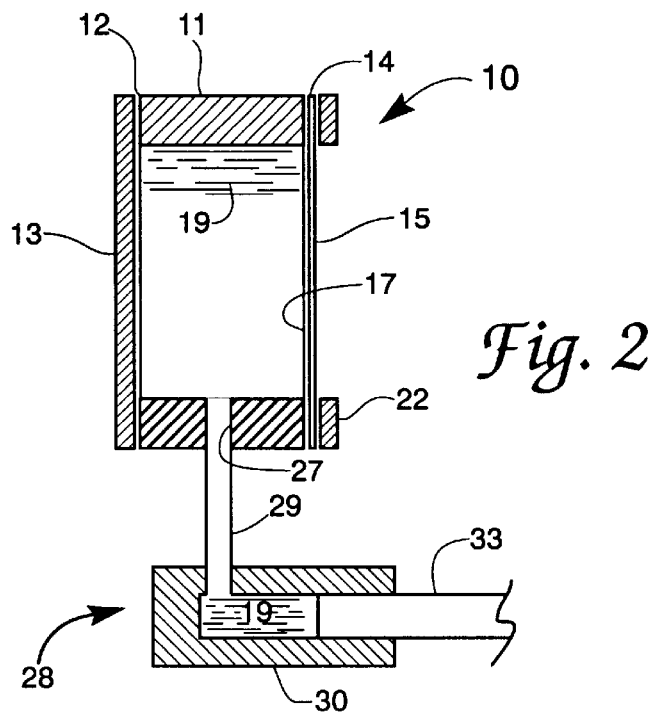
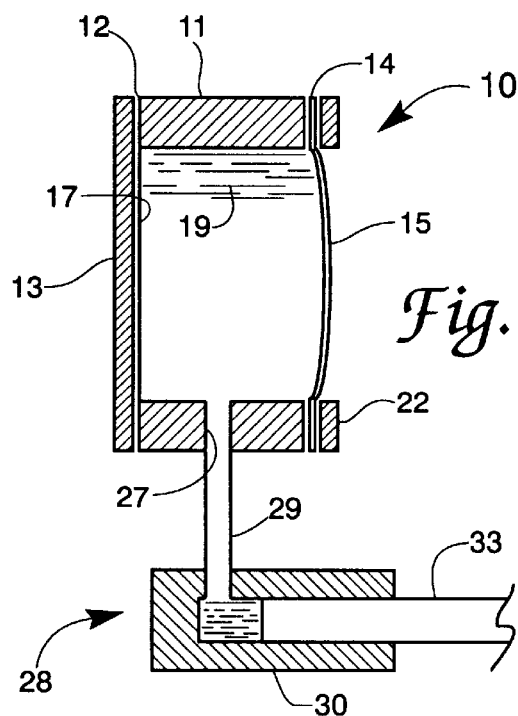
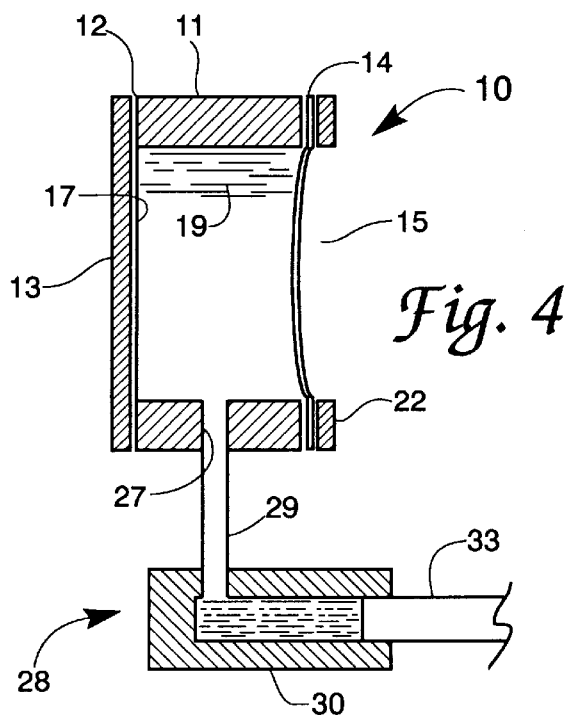

VARIABLE POWER FLUID LENS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to variable power optical lenses, and more particularly to a fluid filled variable power optical lens having a focal length that can be continuously varied to provide focusing capability.

The invention provides a continuously variable power (focal length) lens comprising a generally tubular shaped chamber filled with transparent fluid with a transparent flexible membrane across one opening. As fluid is pumped into or withdrawn from the chamber the elastic membrane bulges outwardly or sags inwardly with predictable curvature in a shape defining a positive or negative optical power surface. The optical power of the lens can be continuously adjusted by selectively varying (increasing or decreasing) the fluid pressure in the chamber.

A variable power lens constructed according to the invention allows focusing of an optical device into which the lens is incorporated without the use of movable mechanical parts and allows continuous adjustment of focal length over a finite range without movable lens elements. The invention may be used in any optical application requiring lens power adjustment or focusing, such as focusing the objective lens of night vision goggles (NVG), or as auto-focusing means for eyeglasses. For example, NVGs presently include objective lenses that require manual focusing by translation of the objective lenses toward or away from the image intensifier tubes to permit viewing of objects at various distances. The device may be used in conjunction with a distance sensor to maintain good image focus as the objective distance changes. Use of a miniature fluid lens of the invention together with a distance sensor and an electromechanical pressure transducer provides an autofocus mechanism that could be retrofit to existing NVGs.

For the purpose of describing the invention and defining the scope thereof, the term "optical" or "optically" shall, in accord with customary usage, be defined herein to include only ultraviolet, visible, near infrared, mid-infrared and far infrared regions of the electromagnetic spectrum lying between about 0.1 to about 1000 microns (see, e.g., *Optical Physics*, Max Garbuny, Academic Press, N.Y., 1965, pp 1–6), and more specifically to the range of from about 0.2 micron, the approximate lower limit of operation of fine quality quartz lenses (Garbuny, p 280), to about 50 microns, the approximate upper limit of operation of long wavelength transmitting material such as thallium bromide-iodide ionic crystal (Garbuny, p 282).

It is therefore a principal object of the invention to provide a variable power optical lens.

It is another object of the invention to provide a fluid filled variable focal length, variable optical power optical lens.

It is yet another object of the invention to provide a variable power optical lens which may be focused without the use of mechanical translation devices.

It is yet another object of the invention to provide a fluid filled variable power optical lens for retrofitting existing optical devices.

It is yet a further object of the invention to provide a variable power optical lens for use in autofocusing devices.

These and other objects of the invention will become apparent as a detailed description of representative embodiments proceeds.

SUMMARY OF THE INVENTION

In accordance with the foregoing principles and objects of the invention, a fluid filled variable power optical lens is described that comprises a substantially tubular shaped housing having in one embodiment an optically transparent elastic membrane disposed over one end thereof and a transparent plate over the second end thereof and defining a chamber containing an optically transparent fluid and in a second embodiment an optically transparent elastic membrane disposed over each end thereof and defining a chamber containing the fluid, and means for inserting or withdrawing fluid from the chamber whereby each membrane is correspondingly selectively bulged outwardly or inwardly in the shape of a convex or concave lens.

DESCRIPTION OF THE DRAWINGS

The invention will be more clearly understood from the following detailed description of representative embodiments thereof read in conjunction with the accompanying drawings wherein:

FIG. 2 is a view in axial section of the assembled lens of FIGS. 1 and 1a;

FIG. 3 is a view of the FIG. 2 lens in a positive power condition with the fluid under positive pressure;

FIG. 4 is a view of the FIG. 2 lens in a negative power condition with the fluid under reduced pressure;

DETAILED DESCRIPTION

Figure 1:
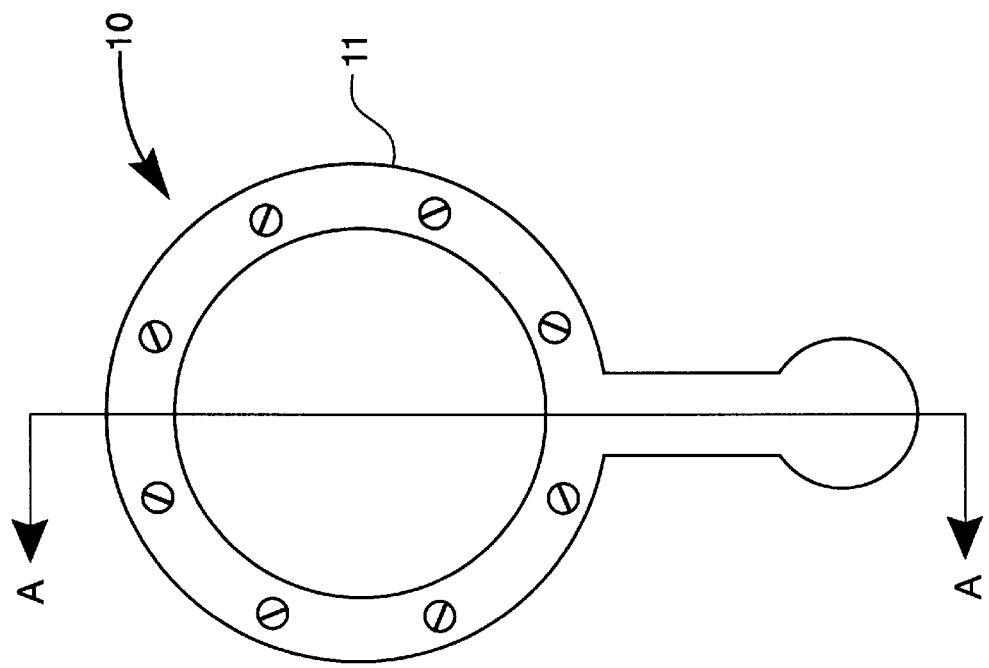
FIG. 1 is a schematic front view of the fluid lens of the invention.
Figure 1A:
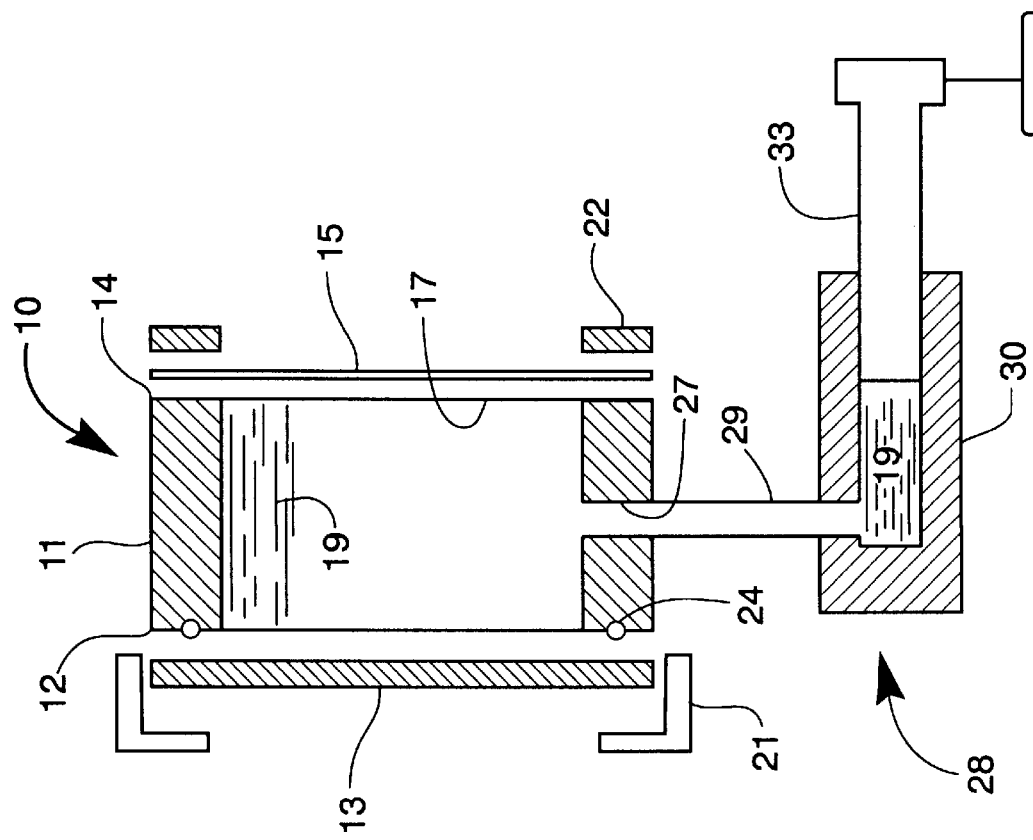
FIG. 1a is a partially exploded axial sectional view of the FIG. 1 lens taken along line A—A.

Referring now to the drawings, FIG. 1 shows a schematic front view of one embodiment of a fluid lens 10 of the invention. FIG. 1a is a partially exploded schematic axial sectional view of lens 10 taken along line A—A of FIG. 1. In the embodiment of FIGS. 1 and 1a, lens 10 comprises a short, substantially tubular housing 11 having at a first end 12 thereof an optically transparent plate 13 and at the second end 14 thereof an optically transparent elastic membrane 15, and wherein housing 11, plate 13 and membrane 15 define a chamber 17 for containing a substantially optically clear fluid. 19. Fluid 19 may comprise any suitable substantially transparent fluid having known index of refraction. Membrane 15 may comprise any suitable transparent flexible material as would occur to the skilled artisan, having thickness typically in the range of about 1 to 50 mils selected to provide any desired flexibility or resistance to bulging, and selected index of refraction in combination with fluid 19, and, similarly, plate 13 may comprise any substantially transparent optical material suitable to its purpose within lens 10. Typical materials having suitable room temperature indices of refraction for use as fluid 19 may include water, glycerin or various oils; membrane 15 may comprise thin glass or any of various suitable plastics including polystyrene, thin acrylic or thin polycarbonate; and plate 13 may comprise acrylic, polycarbonate, styrene or glass, in substantially any combination, although it is understood that other materials may be selected by the skilled artisans practicing the invention, specific material selection not considered limiting of the invention or of the appended claims.

Plate 13 and membrane 15 may each be held in place by suitable means such as threaded flange 21, retaining ring 22 and screws 23, gaskets 24 (not shown in all drawings), or other holding arrangements as would occur to the skilled artisan practicing the invention. Inlet opening 27 is defined in a wall of housing 11 and communicates with source 28 of fluid 19 through conduit 29. Source 28 includes reservoir 30 and fluid pump 31 for inserting and withdrawing fluid 19 into and out of housing 11 in accordance with the governing principle of operation of the invention as described more fully below. Pump 31 may comprise any suitable form such as the plunger 33 and cylinder arrangement illustrated in FIGS. 1, 1a, or a squeezable flexible bulb, or a sealed flexible tube and roller arrangement, the specific form of pump 31 not considered limiting of these teachings or of the appended claims.

Referring now to FIG. 2, shown therein is a view in axial section of lens 10 of FIGS. 1, 1a wherein fluid 19 within reservoir 30 and chamber 17 is not pressurized and membrane 15 is in a correspondingly neutral (flat) configuration and lens 10 is in the zero power (zero diopter) condition. In FIG. 3 it is seen that an increase in the pressure on fluid 19 by activation of pump 31 (represented by inward displacement of plunger 33 to the position suggested in FIG. 3) results in the configuration for lens 10 wherein membrane 15 is bulged outwardly in a substantially spherical shape to an extent corresponding to the pressure on fluid 19 and the flexibility of membrane 15. The FIG. 3 configuration therefore defines a simple plano-convex lens with positive power. The optical power 1/f (in diopters) of the lens is determined by the well-known lensmaker's formula (see, e.g., Jenkins and White, *Fundamentals of Optics*, 3d Ed, McGraw-Hill (New York, 1957), Chap 4):

$$1/f = (n_f - 1)\{(1/R_1) - (1/R_2)\}$$

where f is the focal length of lens 10, $n_f$ is the index of refraction of the selected fluid 19, $R_1$ is the radius of curvature of plate 13 ($R_1$ is taken as infinity for a flat plate), and $R_2$ is the radius of curvature of membrane 15 in meters. For a sufficiently thin membrane 15, its refractive index $n_m$ may be neglected. For example, if water (n=1.33) is selected as fluid 19 and membrane 15 is bulged to a curvature of 0.1 meter (fairly mild curvature), the optical power 1/f is 3.3 diopters. If such a lens 10 so configured were used in front of the objective lens of NVGs, objects only 300 centimeters away would be in sharp focus.

In FIG. 4 it is seen that a decrease in the pressure on fluid 19 in the FIG. 2 lens 10 as by pumping or otherwise withdrawing fluid 19 from housing 11 (represented by outward displacement of plunger 33 to the position suggested in FIG. 4) results in the configuration for lens 10 wherein membrane 15 is concaved inwardly to an extent corresponding to the reduced pressure of fluid 19 and the flexibility of membrane 15. The FIG. 4 configuration therefore defines a simple plano-concave lens with negative power. It is noted further that in the embodiment of FIGS. 1–4, as in all other embodiments described herein or contemplated by the invention, the fluid pump means utilized to insert or withdraw fluid from the lens of the invention may be selected to be controllable to allow selective or continuous change in the optical power of the fluid filled lens while in use.

Figure 5:
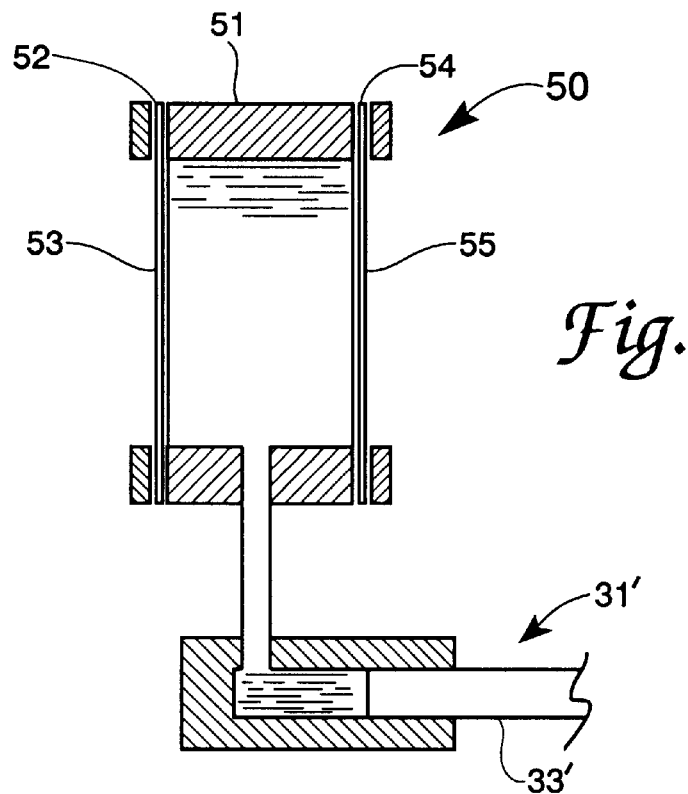
FIG. 5 shows in axial section a fluid lens of the invention having two flexible membranes.
Figure 6:
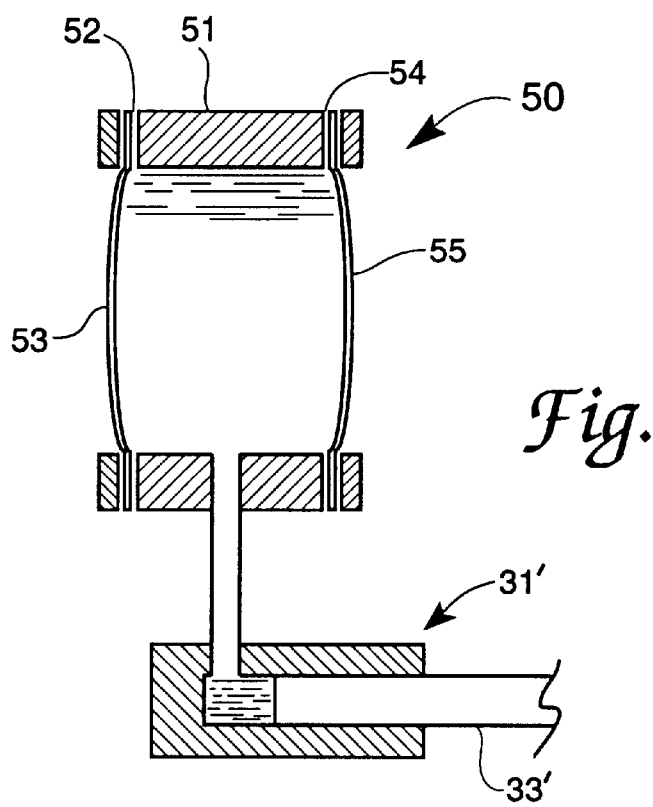
FIG. 6 is a view of the FIG. 5 lens in a positive power condition with the fluid under positive pressure defining a double convex lens configuration.

Referring now to FIG. 5, shown therein is a view in axial section of a lens 50 of the invention comprising housing 51 having two flexible membranes 53,55 disposed over respective first and second ends 52,54, each retained in manner similar to that described above for membrane 15 or plate 13 of lens 10. In FIG. 6 it is seen that an increase in pressure on fluid 19' in the FIG. 5 lens 50 by activation of pump 31' (represented by inward displacement of plunger 33' to the position suggested in FIG. 6) results in the configuration wherein both membranes 53,55 are bulged outwardly in substantially spherical shape, and thereby defines a double convex lens. It is seen further that by pumping or withdrawing fluid 19' from housing 51 (not illustrated in the drawings) would result in a configuration for lens 50 wherein both membranes 53,55 are concaved inwardly to an extent corresponding to the reduced pressure of fluid 19' and the respective flexibilities of membranes 53,55, thereby defining a double concave lens with negative optical power.

Applying the lensmaker's formula given above to the double convex lens configuration of FIG. 6 taking water (n=1.33) as fluid 19' and assuming curvatures for both membranes 53,55 as 0.1 meter results in an optical power 1/f equal to 6.6 diopters.

Referring now again to FIGS. 2–4, it is seen that plate 13 of lens 10 may alternatively be configured in the shape of a lens (either spheric or aspheric, concave or convex or double concave or convex) (i.e., having one or more finite radius(i) of curvature) to provide to the fluid filled lens assembly of the invention a minimum or baseline optical power, or to correct for aberrations in the fluid filled lens, or otherwise to complement the optical power of the fluid filled membrane (15 of FIGS. 1–4) in some way which might be contemplated by the skilled artisan guided by these teachings and practicing the invention. Further, and with reference again to FIGS. 5 and 6, it is noted that membranes 53,55 may be selected with different respective materials, thicknesses and/or flexibilities in order to expand differently and result in correspondingly different optical powers under pressure imposed on fluid 19'. An advantage of using two flexible membranes having different flexibilities allows determination of the shape factor of the lens in reducing aberrations. It is noted further that the cross-sectional shape of housing 11 (see FIG. 1) may be other than circular (for example, oval) whereby a variety of complex lens shapes may be produced.

Figure 7A:
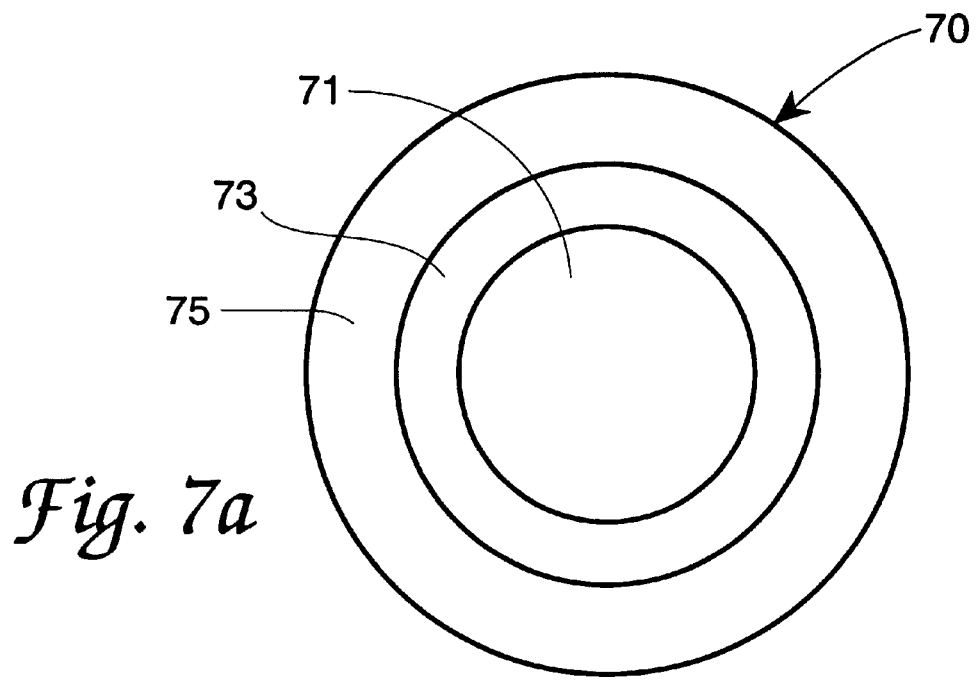
FIGS. 7a, 7b and 7c show, respectively, a schematic top view of a stacked membrane embodiment of the invention, and sectional views of the stacked membranes in the neutral condition and in a pressurized condition.
Figure 7B:
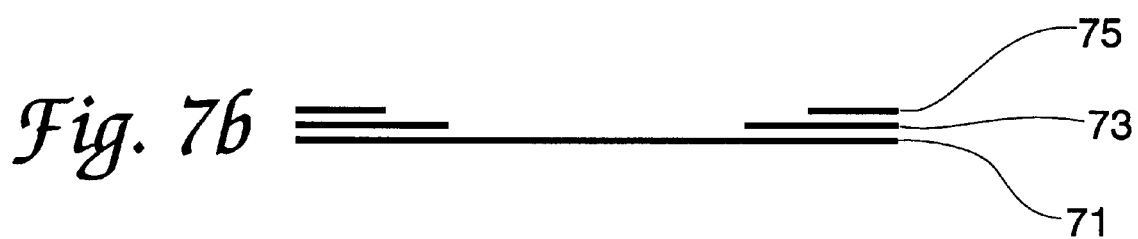
Figure 7C:
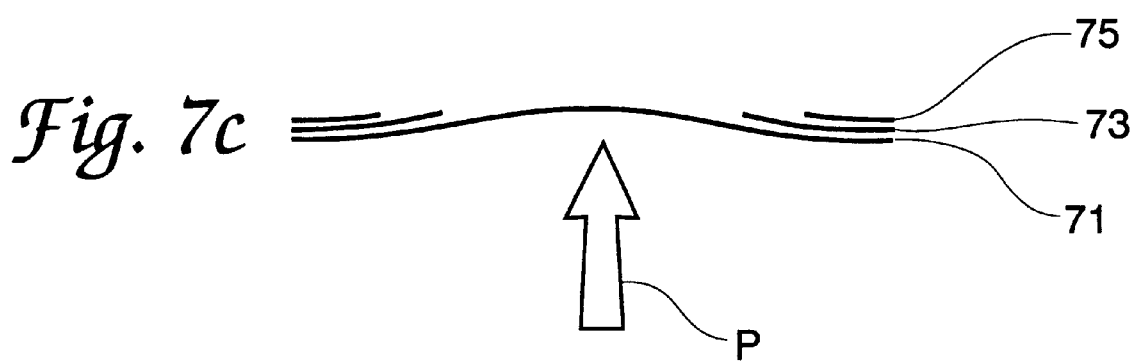

In yet another alternative structure contemplated by the invention herein, membrane 15 of FIGS. 1–4 or one or both of membranes 53,55 of FIGS. 5,6 may be replaced with a multiple elastic membrane stack including one or more annularly shaped disks in the form of a membrane assembly that expands (bulges) in a non-spherical manner to produce an aspheric adjustable lens. Referring now to FIGS. 7a, 7b and 7c, shown therein are, respectively, a schematic top view of a stacked layered membrane 70 of the invention, and sectional views of the stacked membranes in the neutral condition and in a pressurized condition. It is seen in FIG. 7a that such layered stack 70 may comprise a first membrane 71 with one or more annular shaped membranes 73,75 of selected inner radii in laminar contact on membrane 71 as suggested in FIG. 7b. FIG. 7c illustrates the application of pressure p to one side of membrane 70 and the resulting aspherical bulge in a preselected predictable shape. It is noted that the same material or combination of materials may be used to comprise the various membranes 71,73,75, and any suitable number of membranes may be used as would occur to the skilled artisan practicing the invention in order to obtain the desired lens shape.

The invention therefore provides a fluid filled variable power optical lens. It is understood that modifications to the invention may be made as might occur to one with skill in the field of the invention, within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A variable power optical lens comprising:
   (a) a tubular shaped housing having first and second ends;
   (b) an optically transparent elastic membrane assembly disposed at said first end of said housing, said assembly consisting of a stack of a membrane disk and at least one annularly shaped membrane on said membrane disk and in laminar contact therewith;
   (c) an optically transparent plate disposed at the second end of said housing, said housing, membrane assembly and plate defining a chamber;
   (d) a substantially optically transparent fluid disposed within said chamber; and
   (e) means for increasing or reducing pressure on said fluid whereby said membrane assembly is correspondingly selectively bulged outwardly or inwardly.

2. The lens of claim 1 wherein said membrane stack comprises a material selected from the group consisting of glasses and plastics.

3. The lens of claim 1 wherein said fluid is water, glycerin or an oil.

* * * * *